United States Patent Office 2,712,727
Patented July 12, 1955

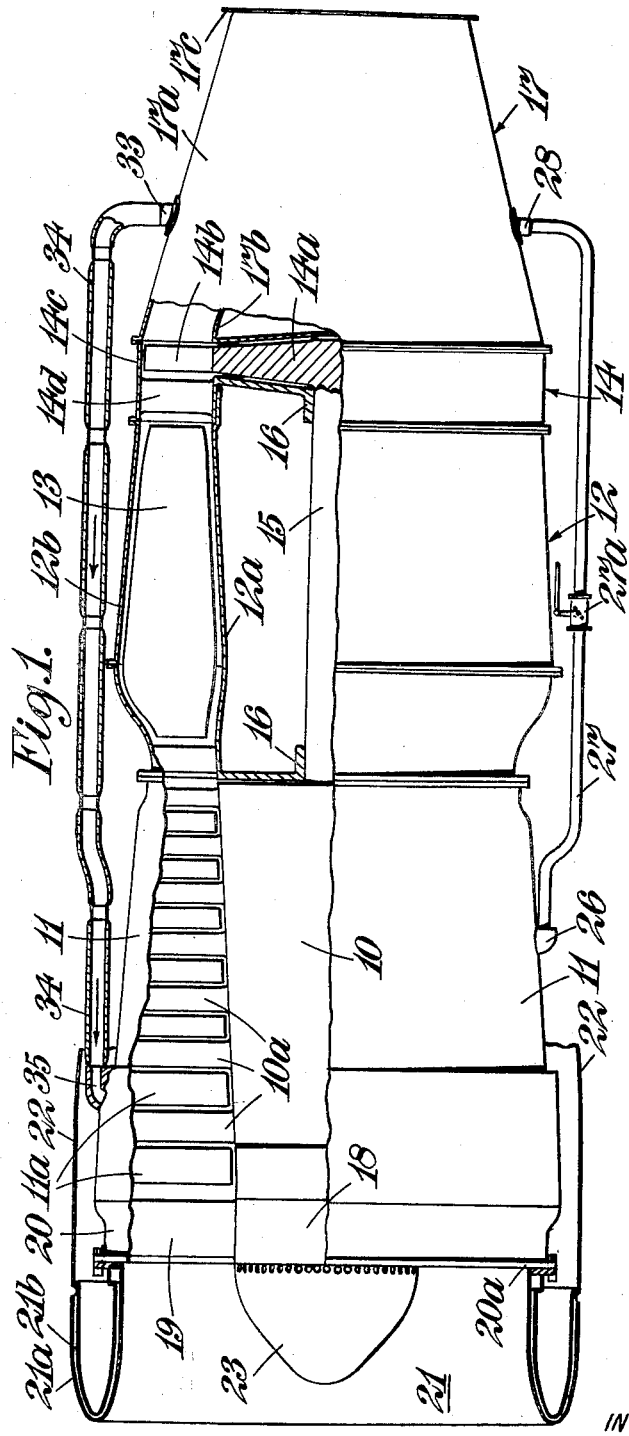

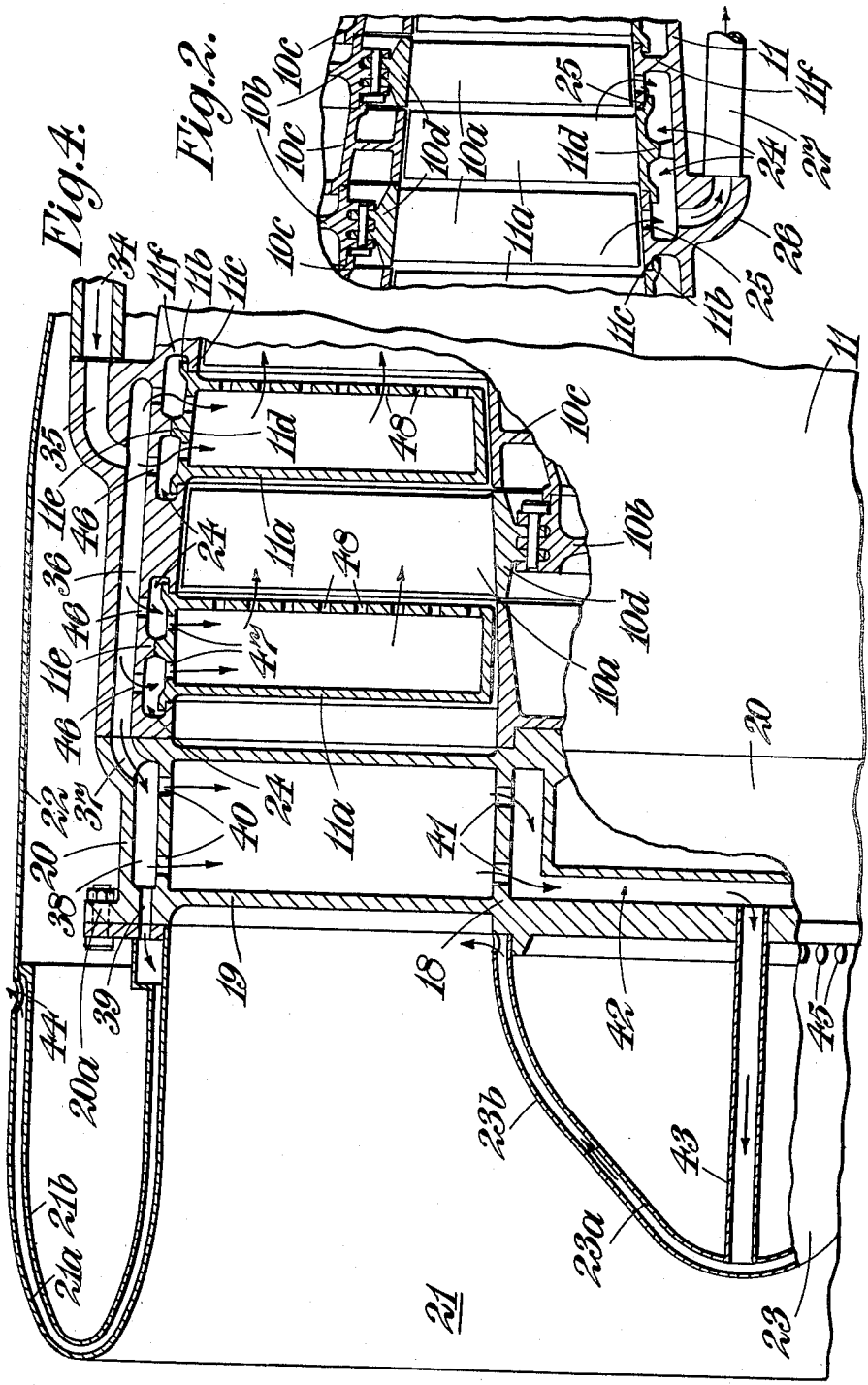

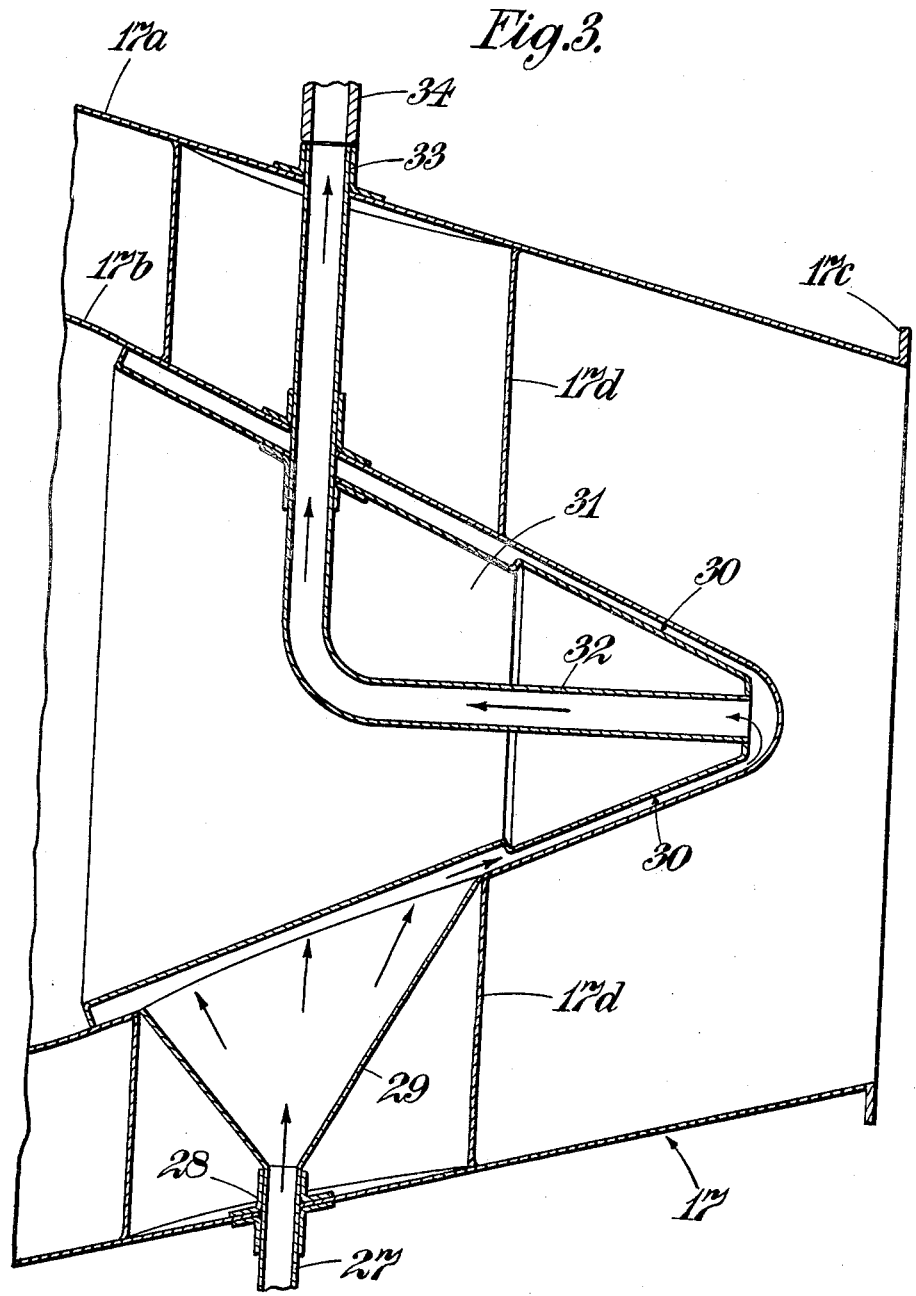

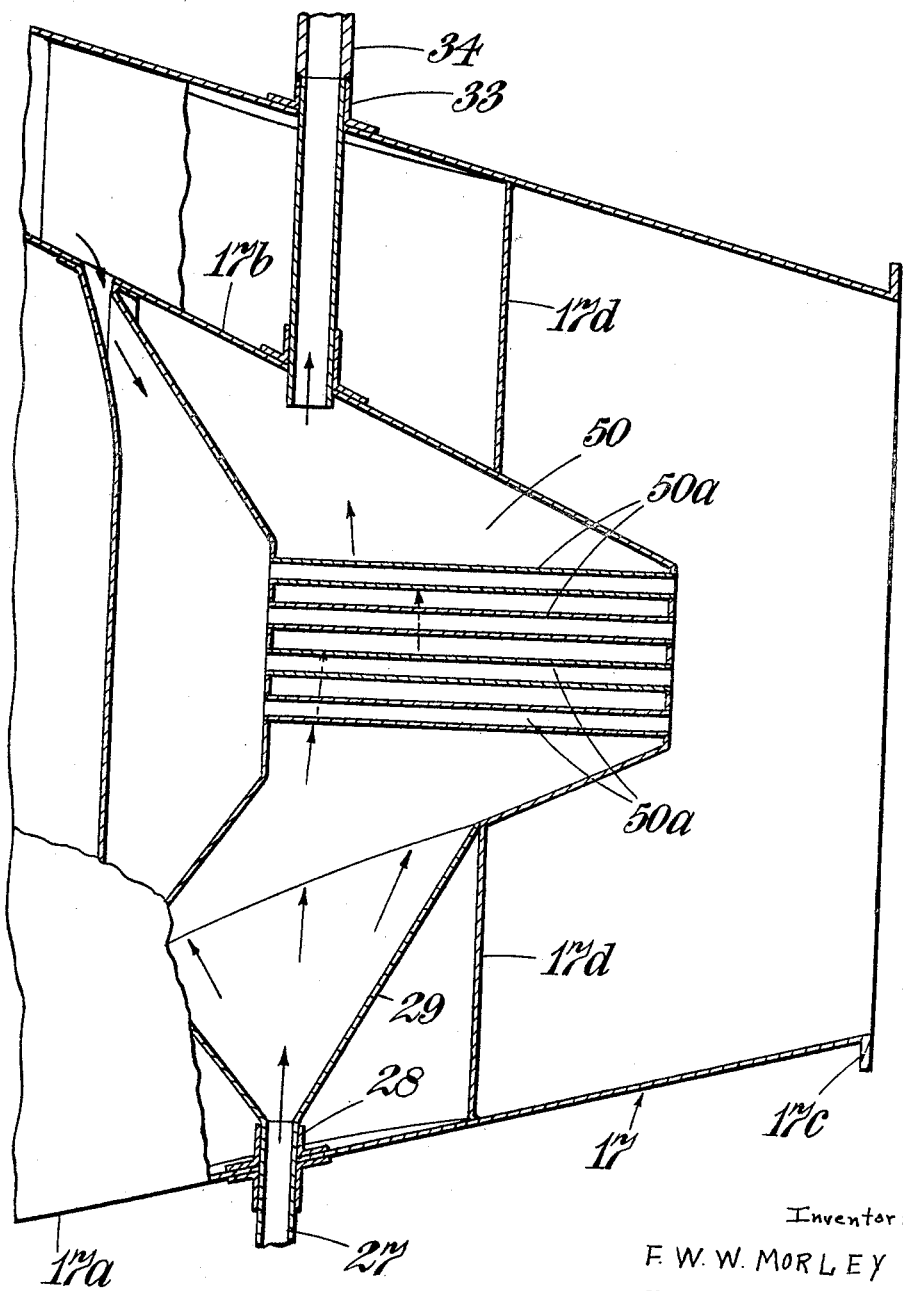

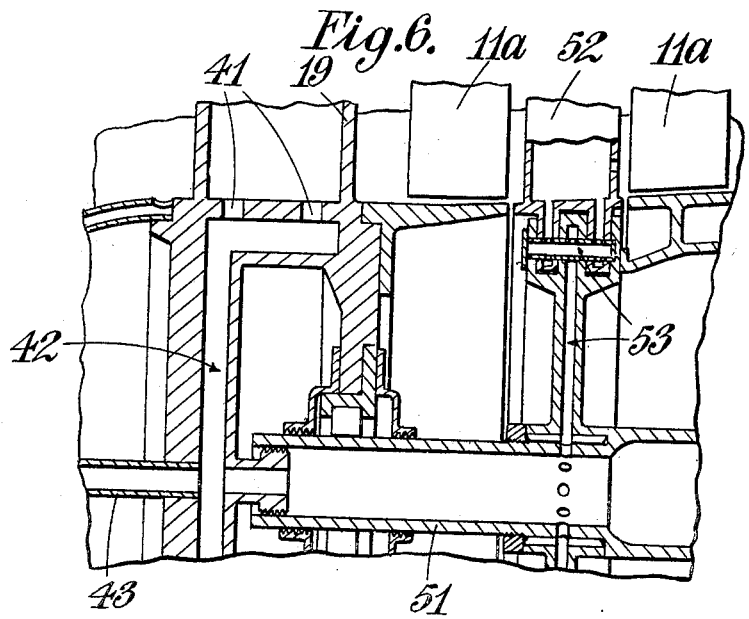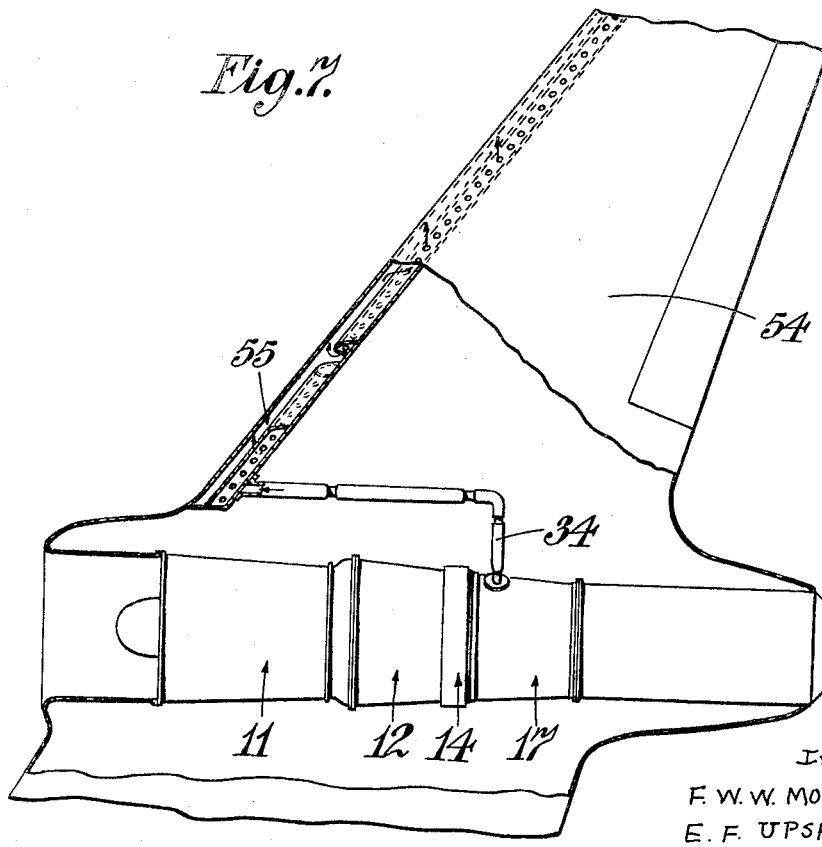

2,712,727

GAS TURBINE POWER PLANTS WITH MEANS FOR PREVENTING OR REMOVING ICE FORMATION

Frederick William Walton Morley, Aston-on-Trent, and Ernest Freeland-Upshall, Clitheroe, England, assignors to Rolls-Royce Limited, Derby, England, a British company Application April 27, 1951, Serial No. 223,331

Claims priority, application Great Britain May 17, 1950

1 Claim. (Cl. 60—39.09)

This invention relates to gas turbine engines of the kind, which will hereinafter be referred to as "of the kind specified," comprising a compressor, combustion equipment to which air compressed by the compressor is led and where it is heated by the combustion of fuel therein, and a turbine in which the products of combustion are expanded to drive it. The products of combustion will hereinafter be referred to, for convenience, as "hot gas." The invention is concerned with means for preventing the formation of ice on, or for removing formed ice from compressor parts of such engines and/or parts associated with the installation of such engines; such means is referred to, for convenience, as "anti-icing means."

An important application of the invention is in gas-turbine engines for use in or installed in aircraft, in the operation of which ice accretion is liable to occur on compressor parts and/or on the aircraft, and the invention is concerned with the anti-icing of said compressor parts, of structure associated with the installation of the engine in the aircraft, and of structure of the aircraft in which such an engine is installed.

One form of anti-icing means proposed hitherto has comprised means to abstract hot gas from the exhaust duct of a gas-turbine engine and to convey it through ducting to the location of its use. Such an arrangement has now been found to be unsatisfactory in operation, since owing to the low pressures which normally exist in the exhaust duct of a gas-turbine engine, it has been necessary to use large diameter ducting for conveying the hot gas to the location where the hot gas is used for anti-icing purposes.

Another form of anti-icing means hitherto proposed comprised means to tap-off air from a compressor system of the gas-turbine engine and to convey the tapped-off air to the inlet of the compressor system for the purpose of preventing ice formation in the inlet. With this arrangement, whilst the tapped-off air has such a pressure as to permit of the use of small diameter ducting to convey it to the compressor inlet, the temperature of the tapped air to considerably less than that of the exhaust gases employed in the first-mentioned form of anti-ising means and, since it is desirable to keep the temperature rise in the compressor to a low value in order to maintain a high efficiency of compression, the temperature of the tapped air cannot be increased in the compressor to a value desirable for anti-icing purposes.

The present invention seeks to provide improved anti-icing means for gas-turbine engine compressor parts, for structure associated with gas-turbine engine installations, and/or for structure of an aircraft in which such an engine is installed.

According to this invention, in a gas turbine engine or gas turbine engine installation, or in an aircraft in which a gas turbine engine is installed, anti-icing means comprises means to tap-off air compressed in the compressor of the engine, means to pass the air so tapped-off in heat exchange relation with hot gas arising from the combustion of fuel in the combustion equipment with air compressed by the compressor, and means to convey the heated tapped-off air, without mixing with the hot gas, to a location at which the heated tapped-off air is used for anti-icing purposes.

The heated tapped-off air may be used for anti-icing the gas turbine engine, in particular the compressor thereof, parts associated with the installation of such an engine, such as an inlet duct for the compressor formed by the structure in which such an engine is installed, and/or parts of an aircraft, such as the wing thereof, in which such an engine is installed.

Preferably, the heat exchanger is located on the downstream side of a turbine system in an exhaust duct associated therewith.

A preferred location of use of the heated tapped-off air is in the inlet to the compressor, e. g. by supply of such air to stationary structure forming part of the inlet duct of the compressor or to the rings of stationary or rotating compressor blading adjacent the inlet of the compressor.

According to a feature of this invention, a gas-turbine engine of the kind specified and comprising an axial-flow turbine system and an exhaust duct structure comprising an outer duct wall and an inner fairing wall affording between them an annular exhaust passage, includes means for tapping-off from said compressor system air which has been compressed, a heat-exchanger located in or forming part of said inner fairing wall of the exhaust assembly and arranged to employ hot exhaust gas as one heat exchange fluid, ducting means for conveying the tapped-off air from said compressor system to said heat-exchanger to pass in heat exchange with the exhaust gases, and ducting means for conveying the heated tapped-off air from said heat exchanger to a location at which the heated tapped-off air is used for anti-icing purposes.

A preferred location of use of the heated tapped-off air which will hereinafter be referred to as "hot air" in distinction to the term "hot gas" defined above, is in the inlet to the compressor; for instance the hot air may be so distributed as to heat parts of the walls of the inlet duct to said compressor, including the intake nose fairing, and/or the blading of the compressor inlet stages.

Whilst it is preferred to locate the heat exchanger on the exhaust side of a turbine system, the heat exchanger may in certain cases be located on the upstream side thereof, so that the tapped-off air is heated by the hot gas in the combustion equipment of the engine.

Valve means may be provided for controlling the tapping-off of the air from the compressor, so that the air need only be tapped-off from the compressor when atmospheric conditions are conducive to ice formation, and in such amount as is necessary to prevent ice formation or remove the ice formed.

Adoption of the invention achieves (as compared with the second proposed form above referred to) a reduction in the quantity of air to be tapped-off from the compressor during operation of the anti-icing means, which is advantageous since the tapping-off of compressed air from the compressor reduces the mass flow into the combustion equipment and turbine of the engine, thereby causing a loss of power. At the same time the tapped-off air is supplied to its location of use at a sufficiently high temperature to permit the reduced quantity to effect the desired anti-icing function.

One embodiment of anti-icing means according to this invention will now be described as applied in a well-known type of gas-turbine installation in an aircraft, reference being made in the description to the accompanying diagrammatic drawings in which—

Figure 1 is a side elevation, partly in section, of the gas-turbine power-plant installation.

Figure 2 is a detailed view of part of Figure 1,

Figure 3 is an axial section through the exhaust unit of the power plant illustrated in Figure 1, Figure 4 is a view to a larger scale of the air intake portion of the power plant shown in Figure 1 showing details of the construction, Figure 5 illustrates a modification, Figure 6 illustrates a further modification, and Figure 7 illustrates the use of the heated air for anti-icing the wing of an aircraft.

Referring first to Figure 1, the gas-turbine power-plant 10 illustrated is of a well-known kind suitable for aircraft propulsion by jet reaction.

The compressor of the gas-turbine engine is illustrated for convenience as an axial-flow compressor having a rotor 10, carrying a plurality of rings of rotor blading 10a, supported for rotation within a casing 11 carrying a plurality of rings 11a of stator blading, the rings of rotor blading 10a alternating with the rings of stator blading 11a.

The compressor outlet is connected to deliver compressed air into combustion equipment indicated at 12, which combustion equipment may be of any convenient kind. In the arrangement illustrated the combustion equipment comprises an inner annular wall 12a, an annular outer wall 12b enclosing the inner annular wall 12a and spaced therefrom, and a ring of flame tubes 13 disposed in the annular space between the inner and outer walls 12a and 12b. Fuel is supplied in any convenient manner to be burnt in the flame tubes 13 thereby to heat the compressed air being supplied to the combustion equipment 12 by the compressor.

The outlet of the combustion equipment is connected to a turbine 14 which comprises, in the arrangement illustrated, a rotor 14a carrying a single row of rotor blades 14b, a turbine casing 14c and a ring of nozzle guide vanes 14d disposed within the casing 14c and between the outlet from the combustion equipment 12 and the rotor blades 14b. The turbine rotor 14a is connected by a shaft 15 to drive the rotor 10 of the compressor, the assembly being supported within the stationary structure of the engine in any convenient manner, for instance, by bearings located at points, indicated by references 16, and by a bearing on the upstream side of the compressor which is carried by bearing housing 18.

The turbine is illustrated as delivering into an exhaust assembly 17 which comprises an outer wall 17a supported from the turbine casing 14c and a substantially conical fairing 17b disposed centrally within the outer walls 17a so as to form an annular exhaust passage which registers at its inlet end with the outlet from the turbine rotor blades 14b. The conical fairing 17b is supported from the outer wall 17a by means of airfoil-section fairings 17d (Figure 3). The outer wall 17a is shown as having a bolting flange 17c at its outlet end so that a jet-pipe may be attached thereto if desired.

The compressor casing 11 has at its inlet end a front bearing support comprising the bearing housing 18 connected by vane-like struts 19 to an outer annular portion 20 forming a forward continuation of the casing 11. A flange 20a is provided at the leading end of the outer annular portion 20 and to this flange there is bolted a nose fairing 21 forming the forward portion of the nacelle or other structure in which the engine is installed, part of which structure is shown at 22. A substantially conical nose cap 23 is supported from the bearing housing 18. The fairing 21 and the nose cap 23 affords between them and air inlet duct for the compressor.

The compressor rotor may be of any convenient construction and is, in the construction illustrated, formed by a number of discs 10b (Figures 2 and 4) having the rotor blading 10a pivoted to the periphery thereof, and a series of spacer rings 10c between the peripheries of the discs, which spacer rings are shown to be of H-section with one of the limbs of each forming an axial continuation of the inner shrouds formed by the platforms 10d of the blades 10a.

It will be understood that the rotor 10 of the compressor may be of any other convenient construction.

The compressor stator is shown for convenience as having its stator blades 11a provided at their outer ends with platforms having parts 11b engaging on outwardly-directed shoulders 11c provided on inwardly-directed ribs 11f and with outward projections 11d bearing against inwardly-directed ribs 11e. With this construction annular passages 24 are formed between the root platforms of the stator blades 11a and the outer wall of the casing.

It will be understood that the stator construction of the compressor may be of any other convenient form.

In the operation of a gas-turbine engine as an aircraft power-plant for instance, great difficulties are often experienced due to ice formation on the nose fairing 21, on the nose cap 23 and also on the parts of the compressor such as the vane-like struts 19 and stator blades 11a and rotor blades 10a.

The embodiment of the present invention provides improved means for "anti-icing" these parts.

In the specific construction illustrated, the means for tapping-off compressed air from the compressor comprises (Figure 2) holes 25 formed in flange-like portions at the inner edges of the ribs 11f of a convenient stage in the compressor, preferably a high-pressure stage. The holes 25 provide communication between the annular working air duct of the compressor and the passages 24 adjacent the appropriate ring of compressor stator blading 11a. The tapping means also comprises a swelling 26 which is in the form of a pipe union and has connected to it ducting 27 so that compressed air flowing through the holes 25 can flow out into the ducting 27 and be conveyed rearwardly towards the exhaust unit 17.

A valve 27a may be provided in the ducting 27 to control the tapping-off of air from the compressor.

The tapped-off compressed air flowing in the ducting 27 is fed (see Figure 3) through a connection 28, mounted on the outer wall 17a of the exhaust assembly, into a flared distributor element 29 accommodated in one of the airfoil-section fairings 17d of the exhaust assembly 17 and is thus conveyed to a heat exchanger of which part of the conical fairing 17b forms the heat exchange surface. The air leaving the flared distributor 29 flows into an annlar manifold and thence rearwardly into a narrow annular space 30 between an inner conical wall 31 and the apex portion of the conical fairing 17b and is thus heated by exchange of heat through the wall 17b with the exhaust gases flowing in the exhaust assembly 17. This arrangement has the advantage that the exhaust gas flow is undisturbed. On reaching the apex end of the conical fairing 17b the heated tapped air passes into a conduit 32 arranged with a portion centrally within the fearing 17b and an outlet portion extending through another of the airfoil section fairings 17d to a union 33 mounted on the outside of the outer wall 17a of the exhaust assembly. Ducting 34 is connected to the union 33 and conveys the hot air forwardly to the location of its use. The ducting 34 is suitably lagged to prevent excessive heat loss from the hot air.

In the construction shown the hot air is employed for anti-icing the nose fairing 21, the nose cap 23, the vane-like struts 19 and the first two stages of stator blading 11a, and the hot air is passed from some of these parts into the working air flow through the compressor, so that the initial stages of rotor blading 10a are also anti-iced.

Referring to Figure 4, the ducting 34 is connected to a union 35 formed as a swelling on the outside of the compressor casing, and the air passage through the union 35 leads to an annularly-extending hot air space 36 formed in an enlarged portion of the compressor casing 11 at the forward end thereof. Part of the hot air flows out from the annular hot air space 36 through ports 37 into an annular chamber 38 formed within the outer annular portion 20, and the hot air entering the annular chamber 38 flows partly through ports 39 into the nose fairing 21, and partly through ports 40 into the interior of the vane-like struts 19 and thence through ports 41 into a collector manifold 42 formed within the front bearing housing 18, and from the manifold 42 through a conduit 43 into the nose cap 23.

As will best be seen from Figure 4, the nose fairing 21 is a double-skinned structure comprising sheet metal walls 21a, 21b which are close together and afford between them a narrow passage leading from the ports 39 to outlets 44 located in the outer surface of the nose fairing 21 rearwardly of the leading edge.

The nose cap 23 is also formed as a double-skinned structure having inner and outer walls 23a, 23b which afford between them a narrow passage for the flow of the hot air entering the nose cap through the conduit 43. The hot air thus heats the nose cap 23, and flows out from it through ports 45 formed in the outer wall 23b thereof, adjacent its trailing edge.

That part of the air not leaving the annular hot air space 36 through the ports 37 flows through further ports 46 into the annular passages 24 around the outsides of the platforms of the first two rows of stator blading 11a and flows from the passages 24 through ports 47 into the interior of the stator blades 11a of the first two stages, which are made hollow, thus heating them. The hot air entering the blades 11a flows out from them through holes 48 into the working air stream flowing in the compressor, and is widely distributed in the working air stream.

The invention is not limited to the precise construction above described. Thus for instance instead of the heat exchange between the tapped-off air and the hot gas being effected as described with reference to Figure 3, the tapped-off air may, as shown in Figure 5, be passed into a tubular heat exchanger 50 assembly located within the conical fairing 17b which is formed with internal passages 50a so that hot exhaust gas can flow through the interior thereof.

Moreover the hot air may be distributed in any convenient manner other than that above described. Thus for instance, as shown in Figure 6, the hot air from manifold 42 may be fed into the interior of a part 51 of the compressor shaft and thus through ducts 53 to hollow rotating blading 52 of a compressor inlet stage or compressor inlet stages.

The hot air may be employed for anti-icing purposes in other parts of an aircraft than the engine installation. Thus for example, as shown in Figure 7, the hot air may be conveyed to the leading edge of a wing 54. In such a case the wing leading edge would be formed with suitable conduit means 55 for distribution of the hot air, for example it might conveniently be formed as shown with a double skin similar to that of the nose fairing 21.

The invention is also applicable to engines other than engines of the reaction propulsion type as illustrated. Thus for instance the invention may be employed in aircraft engines of the gas-turbine type driving an airscrew, or may be employed in stationary gas-turbine engine installations for power generation or in gas-turbine installations for ship propulsion.

We claim:

A gas-turbine engine comprising a compressor, combustion equipment connected to receive air compressed by the compressor to be heated therein by the combustion of fuel, a turbine connected to said combustion equipment to receive gaseous products of combustion to be expanded therein to drive the turbine, and an exhaust duct on the downstream side of the turbine to receive gases exhausting from the turbine, said exhaust duct comprising an outer wall and a substantially conical inner wall spaced within said outer wall, said walls together defining an annular exhaust passage through which pass the gases exhausting from the turbine, a second conical wall of similar shape to said conical inner wall and located within and narrowly spaced from said conical inner wall to define a first chamber, said first chamber having an inlet and an outlet and said first chamber being on the side of said substantially conical inner wall remote from said annular exhaust passage whereby heat exchange may be effected between air in said first chamber and exhaust gases flowing in said exhaust passage, a first conduit connected at one end to said compressor and at its other end to the inlet of said chamber to convey compressed air thereto, the said other end of said first conduit being formed as a distributor to deliver the tapped air to said first chamber, a wall structure having an external surface which requires anti-icing during operation of the engine and having formed therein a second chamber having an inlet and an outlet, a second conduit connected at one end to lead from a point in said first chamber adjacent the apices of said inner and second conical walls and having its other end connected to the inlet of said second chamber, whereby air compressed by said compressor and passed in heat exchange relation with said exhaust gas is delivered to said second chamber to heat said wall which requires anti-icing, and airfoil-section fairing members by which said inner conical wall and said outer wall are interconnected, said distributor and a portion at least of said second conduit being accommodated within said inner conical wall and said airfoil-section fairing members.

References Cited in the file of this patent

UNITED STATES PATENTS

| | | |
|---|---|---|
| 2,469,375 | Flagle | May 10, 1949 |
| 2,473,356 | Birmann | June 14, 1949 |
| 2,473,387 | Peters et al. | June 14, 1949 |
| 2,483,401 | Cole | Oct. 4, 1949 |
| 2,514,105 | Thomas | July 4, 1950 |
| 2,553,218 | Stuart et al. | May 15, 1951 |
| 2,559,851 | Dean | July 10, 1951 |
| 2,563,054 | Messinger et al. | Aug. 7, 1951 |
| 2,594,118 | Boyd | Apr. 22, 1952 |
| 2,599,470 | Meyer | June 3, 1952 |
| 2,625,794 | Williams et al. | Jan. 20, 1953 |
| 2,647,366 | McCann | Aug. 4, 1953 |